United States Patent
Hogan et al.

(10) Patent No.: US 7,272,529 B2
(45) Date of Patent: Sep. 18, 2007

(54) DUAL WALL TURBINE BLADE ULTRASONIC WALL THICKNESS MEASUREMENT TECHNIQUE

(75) Inventors: Robert J. Hogan, Chandler, AZ (US); James A. Hall, Gilbert, AZ (US); Surendra Singh, Chandler, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 11/178,020

(22) Filed: Jul. 8, 2005

(65) Prior Publication Data

US 2007/0118330 A1   May 24, 2007

(51) Int. Cl.
*G01B 5/02*   (2006.01)

(52) U.S. Cl. .......................... 702/171; 73/588; 73/602; 73/620; 73/624; 73/625; 73/628; 73/641; 600/446; 600/449; 600/450

(58) Field of Classification Search ................ 702/171; 73/588, 602, 620, 624, 625, 628, 641; 600/446, 600/449, 450
See application file for complete search history.

(56) References Cited

U.S. PATENT DOCUMENTS

| | | | |
|---|---|---|---|
| 3,795,133 A | 3/1974 | Fergason et al. | |
| 4,049,954 A | 9/1977 | Da Costa Vieira et al. | |
| 4,449,029 A | 5/1984 | Nied | |
| 4,570,486 A | 2/1986 | Volkmann | |
| 4,807,635 A | 2/1989 | Ophir | |
| 5,038,615 A | 8/1991 | Trulson et al. | |
| 5,119,678 A | 6/1992 | Bashyam et al. | |
| 5,174,952 A * | 12/1992 | Jongenburger et al. | 419/23 |
| 5,408,884 A | 4/1995 | Sabourin | |
| 5,585,563 A | 12/1996 | Bui | |
| 5,672,263 A * | 9/1997 | Raulerson et al. | 205/641 |
| 5,907,098 A | 5/1999 | Tsubol et al. | |
| 6,082,198 A | 7/2000 | Sabourin et al. | |
| 6,534,975 B2 | 3/2003 | Beeck et al. | |
| 6,850,874 B1 * | 2/2005 | Higuerey et al. | 703/4 |
| 6,968,290 B2 * | 11/2005 | Wei et al. | 702/171 |
| 2002/0134159 A1 | 9/2002 | He | |
| 2004/0050165 A1 | 3/2004 | He | |
| 2004/0261532 A1 | 12/2004 | Sabin et al. | |

OTHER PUBLICATIONS

PCT International Search Report PCT/US2006/026302, Oct. 30, 2006.

\* cited by examiner

*Primary Examiner*—Carol S. W. Tsai
(74) *Attorney, Agent, or Firm*—Ingrassia Fisher & Lorenz

(57) ABSTRACT

A method and apparatus is provided to analyze a dual wall structure having at least one hollow core therein and having the same unknown material sound velocities in walls and in post as well. A transducer is located in at least two different positions with respect to the structure, whereby the transducer propagates an ultrasonic wave toward the dual wall structure. A portion of the ultrasonic wave is reflected back to the transducer. One wave traverses a portion of the dual wall structure that has a core filled with a medium having a known material acoustic property. A second wave traverses a portion of the post that has an unknown material sound velocity. From time of flight measurements of the above mentioned waves, the wall thickness and core shift, if any, can be determined.

23 Claims, 9 Drawing Sheets

DUAL WALL TURBINE BLADE ULTRASONIC WALL THICKNESS MEASUREMENT TECHNIQUE

BACKGROUND OF THE INVENTION

This invention generally relates to a method for non-destructively measuring the wall thickness or core shift of dual wall structures having a single crystal or oriented polycrystalline structure. More particularly, this invention relates to using ultrasonic wave propagation and reflection to determine the thickness of dual wall structures and to determine core shift when knowledge of the material sound velocity is not necessary.

United States Patent Application Publication No. 2004/0261532 discloses the principle of measuring the thickness of a solid injection molded layered material by the use of multiple transducers. This publication does not disclose how to determine core dimensions, or how to obtain thickness data from a material of unknown sound velocity.

U.S. Pat. No. 5,907,098 discloses an apparatus and method to determine the thickness and defects for an object, such as a turbine blade, by vibrating the turbine blade. This patent does not disclose how to determining dual wall thickness or hollow core dimensions from a core or material of unknown sound velocity.

Advances in turbine blade design have led to internal geometries, such as dual wall construction having hidden wall thicknesses that conventional ultrasonic wall thickness measurement techniques cannot efficiently measure. This is because the knowledge of material sound velocity is needed in the prior art.

Computer axial tomography (CAT) scanning is currently the most prevalent practice used to inspect dual wall turbine blades in the prior art. This inspection technique includes the determination of the thickness of dual walled turbine blades and is expensive and requires use of specialized and costly equipment. In the prior art, a single wall turbine blade or single wall workpiece to be analyzed may typically be immersed into a water tank for ultrasonic evaluation by an immersion transducer. Typically, an immersion transducer may be designed to operate in a liquid environment, such as a water tank. The immersion transducer may not usually contact the workpiece. The immersion transducer may send and receive ultrasonic waves via water as a couplant.

As can be seen, there is a need for improved apparatus and methods to analyze dual walled structures, such as turbine blades at a cost of less than what can be done using CT technology. Furthermore, there is a need to improve product development cycle time and reduce field failures due to thin walls or core breakout.

SUMMARY OF THE INVENTION

In one aspect of the present invention a method to determine a dual wall thickness and to detect core dimensions of a workpiece, comprising the steps of propagating at least one incident ultrasonic wave from a transducer toward the workpiece either in pulse echo or pitch-catch mode; receiving a first reflected ultrasonic wave by said transducer, said first reflected ultrasonic wave resulting from said incident ultrasonic wave encountering at least one acoustic interface of the workpiece, said incident ultrasonic wave and said first reflected ultrasonic wave both traversing material having an unknown material sound velocity; and receiving a second reflected ultrasonic wave by said transducer, said second reflected ultrasonic wave resulting from incident ultrasonic wave encountering said at least one acoustic interface of the workpiece, said incident ultrasonic wave and said first reflected ultrasonic wave both traversing material having a known and unknown material sound velocity in core and walls; respectively.

In another aspect of the present invention an ultrasonic inspection method for a dual wall structure having solid material and a hollow core, comprising the steps of positioning an immersion transducer for wave propagation toward a surface of the dual wall structure, said immersion transducer capable of propagating a pulsed incident longitudinal ultrasonic wave at position A and capable of being repositioned at a position B relative to the workpiece for propagating a pulsed incident longitudinal ultrasonic wave at position B; propagating said pulsed incident longitudinal ultrasonic wave at position A of said surface, said pulsed incident longitudinal ultrasonic wave at position A directed substantially perpendicular to said surface; receiving a first reflected ultrasonic wave resulting from said pulsed incident longitudinal ultrasonic wave at position A encountering at least one acoustic interface; propagating said pulsed incident longitudinal ultrasonic wave at position B toward a second area of said surface, said pulsed incident longitudinal ultrasonic wave at position B directed substantially perpendicular to said area; receiving a reflected ultrasonic wave resulting from said pulsed incident longitudinal ultrasonic wave at position B encountering said at least one acoustic interface, whereby the position of said transducer at one of said locations enables either of said incident and resulting reflected wave, or said incident at another position and resulting reflected wave to traverse through the solid material of the workpiece, and the position of the transducer at the other of said location enables the other of said incident and resulting reflected wave, or said incident and reflected wave to traverse through the hollow core of the workpiece, respectively; and measuring the time of flight from said propagating step to said receiving step.

In yet another aspect of the invention there is provided an ultrasonic testing method to determine characteristics of a dual wall turbine blade having a hollow core and post therein, comprising the steps of positioning an immersion transducer at a position A for wave propagation toward an area on a surface of the turbine blade, said immersion transducer capable of propagating an incident pulsed ultrasonic wave and receiving a reflected ultrasonic wave, said immersion transducer capable of being repositioned at a position B for wave propagation and reception; propagating said incident pulsed ultrasonic wave and receiving said reflected ultrasonic wave while said transducer is at said position A, and while said transducer is at said position B, said position A directs said incident pulsed ultrasonic wave to traverse the hollow core of the dual wall turbine blade, and said position B directs said incident pulsed and reflected ultrasonic waves to traverse the post of the dual wall turbine blade; measuring a time of flight of said incident pulsed ultrasonic wave and said reflected wave while said immersion transducer is at said position A and said position B, respectively; and determining the characteristics of the turbine blade from information obtained from said measuring step.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides apparatus and methods for dual wall verification which may be accomplished by ultrasonic inspection of (1) a post having an unknown material sound velocity, and (2) the dual walls that are separated to define a hollow core disposed adjacent to the post. The hollow core is filled with media having a known material acoustic property. Ultrasonic scanning results can be digitally displayed showing the actual wall thickness, a core shift, or hollow core dimensions. Ideally, the hollow core (either the inner hollow core or minor hollow core) of the workpiece that the present invention can inspect, matches the core of the mold, in which there is no shifting of the hollow core. However, casting core shift, or shifting of the core from the location of the mold core may impact the integrity of a turbine blade.

Specifically, this invention can be used to determine the wall thickness and core shift, and hollow core dimensions of dual wall turbine blades at a substantial cost and time savings as compared with CAT scanning. A hollow core of a dual wall structure, like a turbine blade, can shift from the mold core location. This shift can occur in an inner hollow core corresponding to an inner core of the mold, or a minor hollow core corresponding to a minor core of the mold. Ideally, the inner core and minor core do not shift during the casting/manufacturing process.

The cost to use prior art CAT scanning of dual wall turbine blades is high. The cost of the ultrasonic scanning under the present invention may be about 1/10 to 1/4 of the cost of CAT. The inner hollow core, which may correspond to an inner core of the mold from which the inner hollow core is formed, can be interior of the minor hollow core, which may correspond to the minor core of the mold.

This invention differs from the prior art by providing a method and apparatus to efficiently, from a cost and time perspective, non-destructively analyze dual wall structures, such as turbine blades (including rotor blades and stator vanes). With the present invention, the thickness of a solid material having dual wall construction, and the location of one or more hollow cores, or voids within the solid material can be determined without knowing the crystal orientation or material sound velocity.

Figure 1:
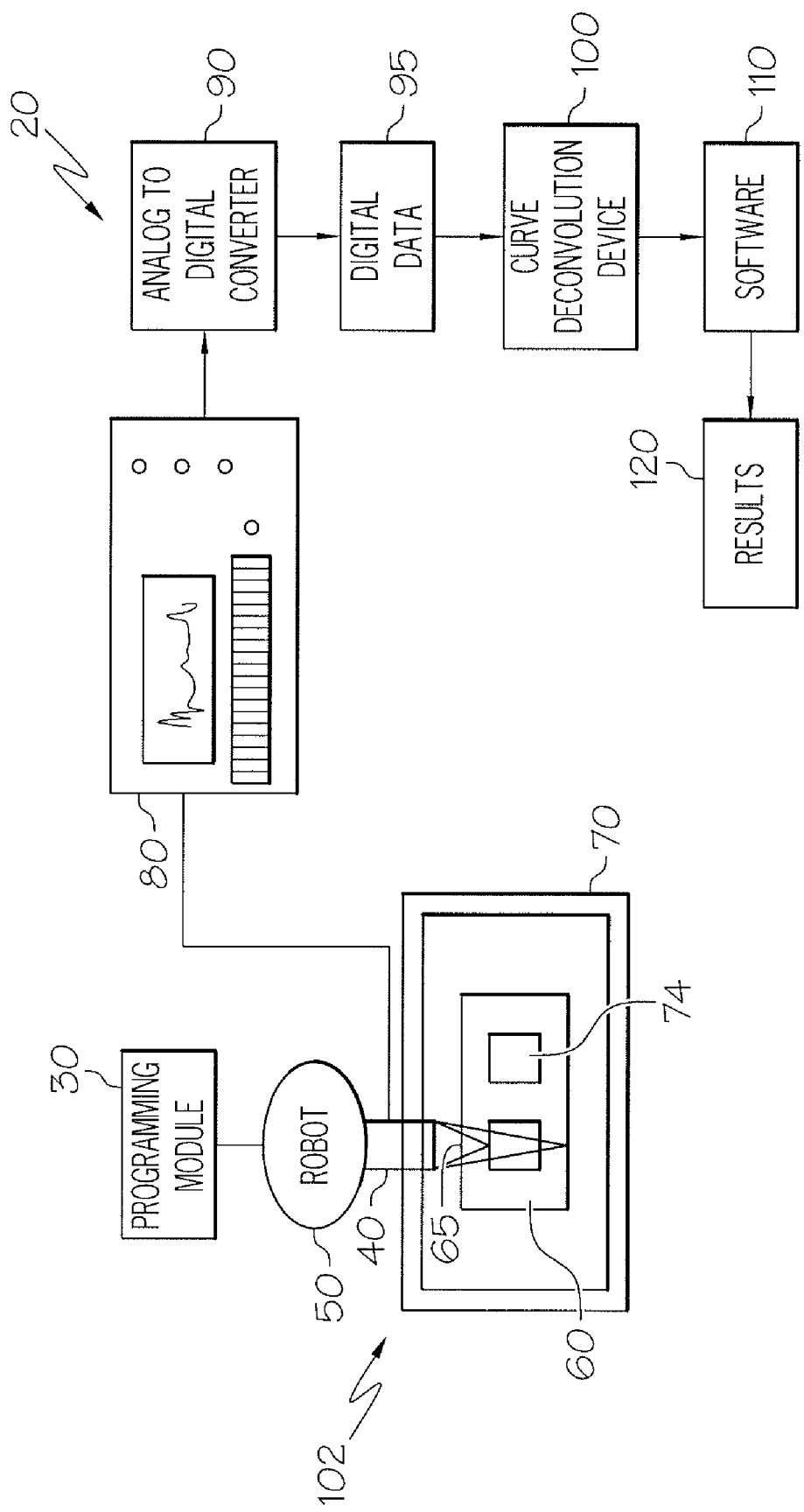
FIG. 1 is a schematic of the present invention in an operating environment.
Figure 3:
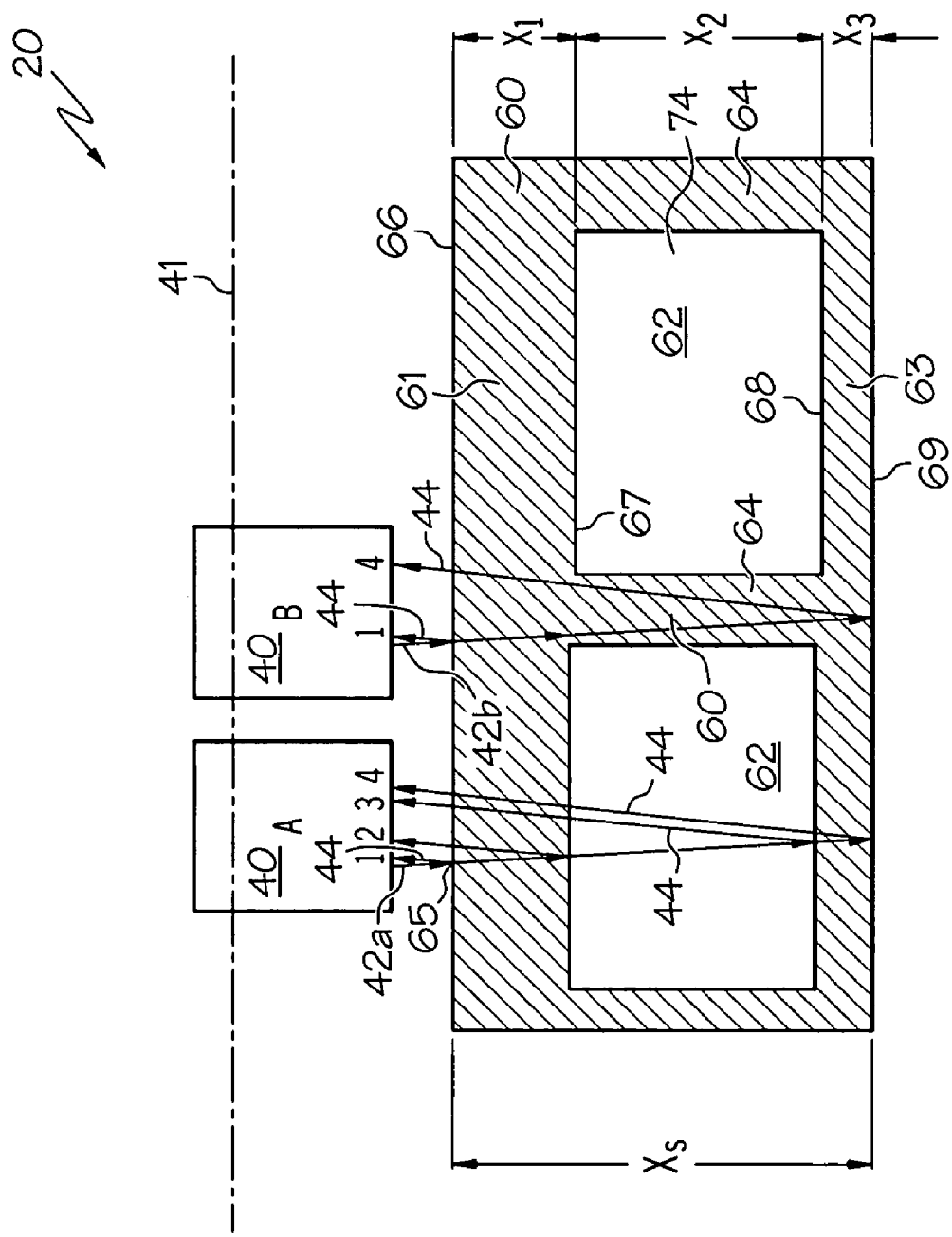
FIG. 3 is a sectional schematic of a dual wall structure showing transducer locations according to the present invention.

FIG. 1 is a schematic of a dual wall analysis apparatus 10 in an operating environment according to one exemplary embodiment of the instant invention. The operating environment 20 may include a programming module 30 that may be operably connected to a transition member, such as a robot 50, to control the contoured movement of a transducer 40. Alternatively, the transducer 40 can be manually manipulated with the transition member being a hand-held jig (not shown). The contoured movement refers to the transducer 40 moving along a transducer path 41 (illustrated in FIG. 3) that may be substantially equidistant from the workpiece 60 while following any curvature of the workpiece 60. The workpiece 60 is shown submerged in a couplant filled tank 70. Although FIG. 1 shows, for illustration purposes the use of immersion tanks, coupling can be achieved by other methods such as squirters, bubblers and contact methods. A signal generator-receiver 80 may be operably connected to the transducer 40 to control the sending of an incident ultrasonic wave 42 toward the workpiece 60, and to acquire data from a received reflected ultrasonic wave 44 from the workpiece 60, as best seen in FIG. 3. At a given time and location, the transducer has ultrasonic wave, such as a incident ultrasonic wave 42a at position A, or a 42b at position B (Illustrated in FIG. 3).

A variety of transducers 40 can be utilized in the present invention. As an example, transducer 40 may be a flat transducer, a parallel transducer, an immersion transducer, a cylindrical transducer, a spherical transducer, a focused (Spherical or Cylindrical) and non-focused (Collimated or Parallel), or a contact (squirter/bubbler) transducer. Also, in an exemplary embodiment, the incident ultrasonic wave 42a or 42b can be a pulsed incident longitudinal ultrasonic wave.

The incident ultrasonic wave 42a or 42b can be oriented by positioning the transducer relative to the workpiece to travel in a direction that is substantially perpendicular to the workpiece surface.

The workpiece can be a dual wall turbine blade having a material structure of single crystals, oriented polycrystals, or directionally solidified material.

Figure 8:
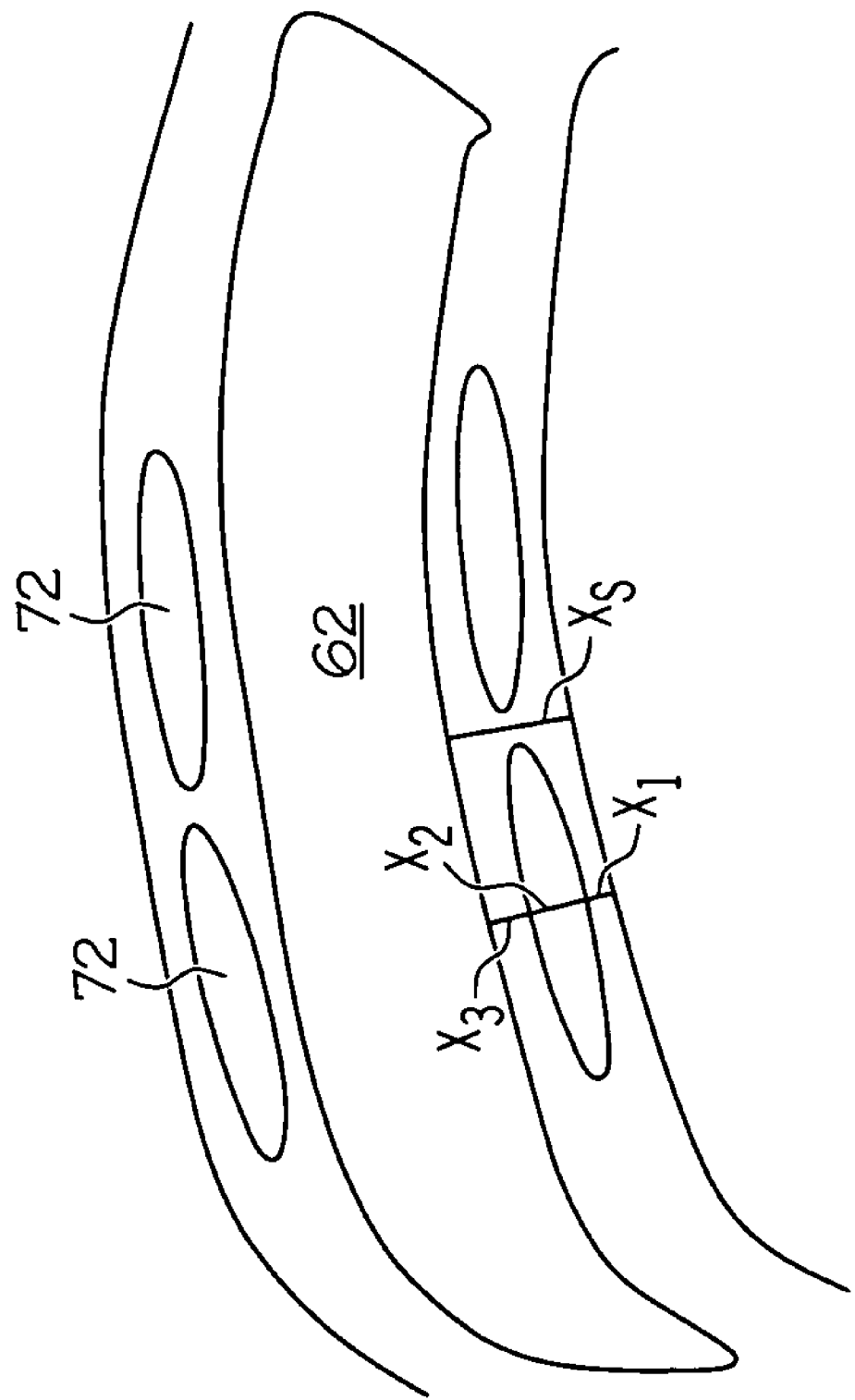
FIG. 8 is a sectional view of a portion of a turbine blade showing an inner hollow core and a minor hollow core, according to the present invention.

FIG. 1 also illustrates an analogue-to-digital (A to D) converter 90 which may be operably connected to the signal generator-receiver 80 to convert analogue data to digital data 95. The digital data 95 may also be operably connected to a curve deconvolution device 100, to remove distortions and effects of system response signals from the actual time of flight signals. The analogue-to-digital converter 90 may also be operably connected to software 110 to perform calculations such as calculation of the solid wall thickness and the shifting, if any, of either the inner core 62 or minor hollow core 72 (FIG. 8). Shift of the inner hollow core 62 or minor hollow core 72 may arise from a combination of thermal exposures during the casting process; thermal stresses and associated warping of the mold inner core or mold minor core corresponding to the inner hollow core 62 and minor hollow core 72; mechanical damage from handling; and other causes. The software or calculating device 110 can produce and/or store results 120 in the form of a display or printout of data. For example the results 120 can be displayed on an oscilloscope (not shown).

FIG. 1 illustrates transducer 40 aligned to propagate an incident ultrasonic wave 42 substantially perpendicular with respect to a surface 65 of the workpiece 60. A useful frequency for wave propagation may be in the range of from about 1 to about 100 megahertz. A desired range of wave propagation may be about 10 to about 100 megahertz. The frequency of the transducer 40 can be controlled by the signal generator-receiver 80 to maximize signal strength from a termination surface 69 of the workpiece 60, as seen in FIG. 2.

Figure 2:
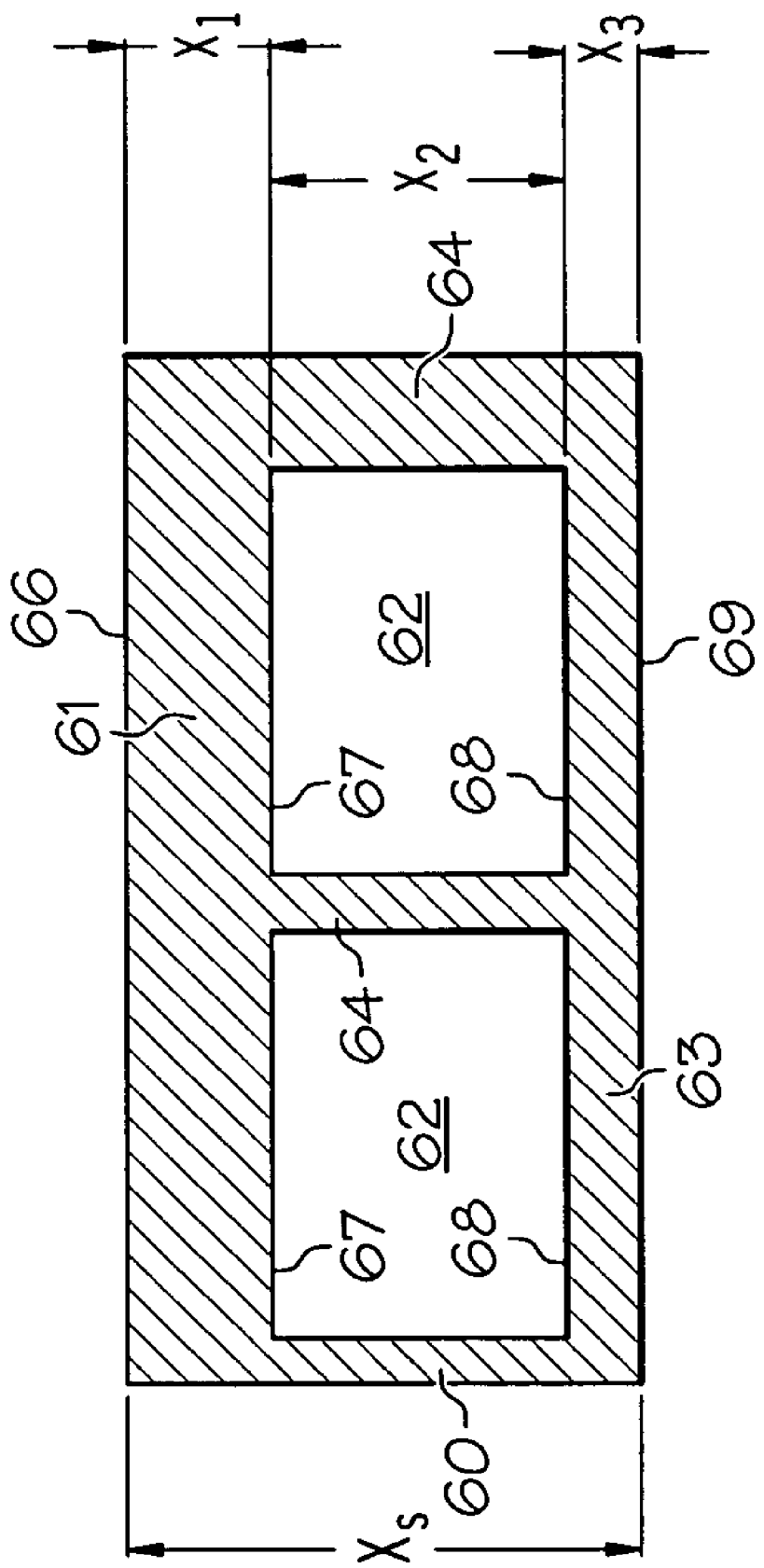
FIG. 2 is a sectional schematic of a dual wall structure, according to the present invention.

Further illustrated in FIG. 2 is an initial surface 66 of the workpiece 60 disposed closest to the transducer 40, a hollow core proximal surface 67, and a hollow core distal surface 68. The initial surface 66, hollow core proximal surface 67, hollow core distal surface 68, and termination surface 69 may all provide an acoustical interface for the incident ultrasonic wave 42, which can create a reflected ultrasonic wave 44 as seen in FIG. 3. As seen in FIGS. 2 and 3, the hollow core proximal surface 67, hollow core distal surface 68, and posts 64 may define an inner hollow core 62 or minor hollow core 72 therein. During testing and analysis procedures of the present invention, the inner hollow core 62 and minor hollow core 72 (as illustrated in FIG. 8) may be filled with media 74 (as shown in FIG. 1), which may be a fluid, such as water, or a solid with known acoustic characteristics.

FIG. 3 illustrates a sectional view of a typical dual wall workpiece 60, which may be a turbine blade, for which this invention can be designed. $X_1$ defines the wall thickness of the front wall 61, which may be bound by the initial surface 66 and the hollow core proximal surface 67. $X_2$ defines the thickness of the inner hollow core 62, or the minor hollow core 72 (FIG. 8), which is bound by the hollow core proximal surface 67, the hollow core distal surface 68, and posts 64. $X_3$ defines the thickness of the back wall 63, which may be defined by the hollow core distal surface 68 and the termination surface 69. $X_s$ defines the thickness of the workpiece 60, which also represents the thickness of the post 64 between the initial surface 66 and the termination surface 69. The X variables referred to hereinabove, $X_s$, $X_1$, $X_2$, and $X_3$, may apply equally to any such hollow core, as the inner hollow core 62 or minor hollow core 72 (FIG. 8). The testing or evaluation procedure, formulas, and time of flight values may apply equally to the inner and minor hollow cores 62, 72.

This invention may apply to the workpiece 60 having a solid connection or a post 64, the post 64 having substantially the same crystallographic orientation as a front wall 61 and back wall 63 as illustrated in FIGS. 2 and 3. The post 64, front wall 61, and back wall 63, can define either an inner hollow core 62 or a minor hollow core 72, therein. Further, the workpiece 60 can have a thickness, defined herein as $X_s$ (as illustrated in FIGS. 2 and 3) that is essentially uniform throughout the front wall 61 and back wall 63 of the workpiece 60 over the area in which the transducer 40 propagates and receives the incident and reflected ultrasonic waves 42, 44. Further, although the material sound velocity of the workpiece 60 may not be known, the material sound velocity of the media 74 within the inner hollow core 62 or minor hollow core 72 should be known before the inspection technique of the present invention. During testing, the inner hollow core 62 or minor hollow core 72 may be filled with media, of known acoustic properties.

Referring to FIG. 3, from the "A" position, the transducer 40 can propagate an incident ultrasonic wave 42a. Alternatively, transducer 40 can send an incident ultrasonic wave 42b from the "B" position The incident ultrasonic wave 42a or 42b may be directed at an area 65 on the initial surface 66, and the incident ultrasonic wave 42 may encounter the initial surface 66, the hollow core proximal surface 67, the hollow core distal surface 68, and the termination surface 69, all which may act as acoustic interfaces, producing a first or second reflected ultrasonic wave 44, respectively. Although the reflected ultrasonic wave 44 (first or second) is written in singular, it is understood that the incident ultrasonic wave 42 may often produce several reflected ultrasonic waves 44. Typically, a reflected ultrasonic wave 44 may be produced each time when an incident ultrasonic wave 42 encounters an acoustic interface.

Figure 4:
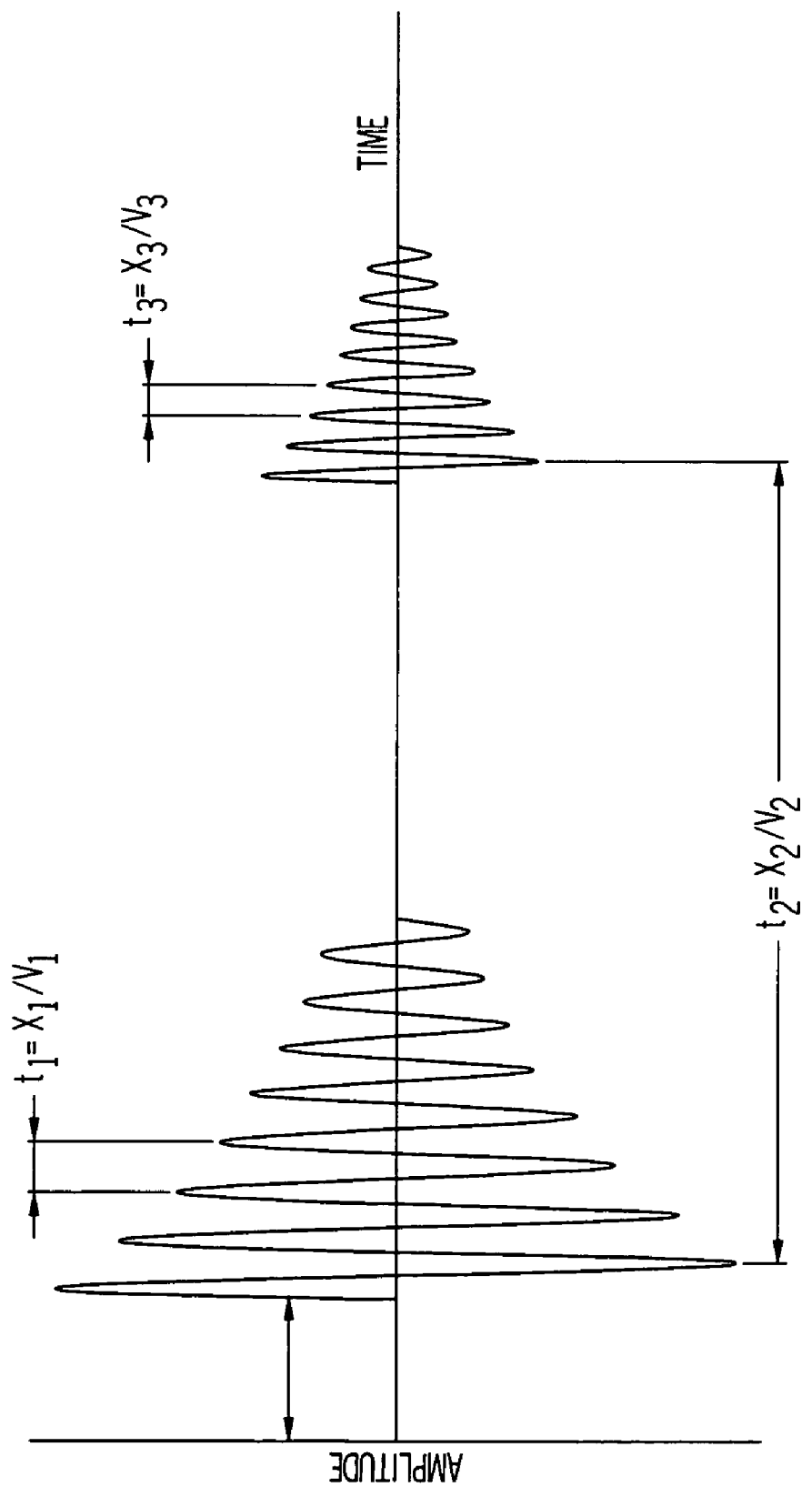
FIG. 4 is an schematic for A scan that is obtained from an ultrasonic scan through a hollow core, according to the present invention.

As a result of the transducer 40 operating in the "A" position, four separate reflected ultrasonic waves 44 may be produced and received by the transducer 40, the results of which can be displayed as shown in FIG. 4.

FIG. 4 illustrates a wave display generated from the transducer in "A" position of FIG. 3. FIG. 4 does not illustrate any signal that is received from the post 64.

After this sampling, the location and thickness of the inner hollow core 62 can be determined. $X_2$ represents the hollow core distance between the hollow core proximal surface 67 and the hollow core distal surface 68. The material sound velocity of the media within the inner hollow core 62 is known. The media within the hollow core is a material with known acoustic properties. The time between second reflected wave and third reflected wave 44 may be measured ($t_2$) and can be used to calculate $X_2 = V_2 t_2$.

Figure 5:
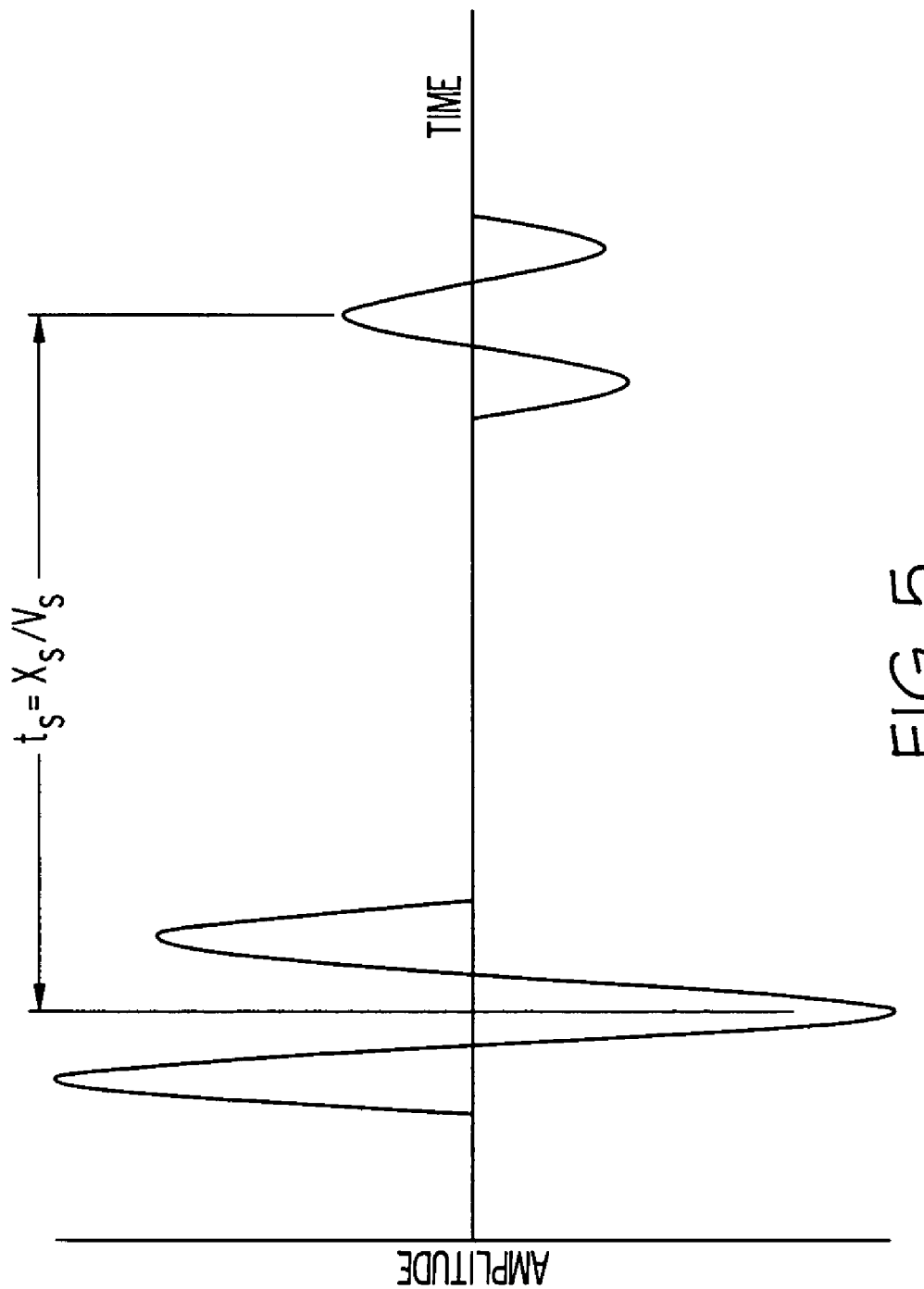
FIG. 5 is an schematic for A scan that is obtained from an ultrasonic scan through a post, according to the present invention.

FIG. 3 illustrates a second position of the transducer 40 shown as the "B" position. Here, two reflected ultrasonic waves 44 may be produced by reflection of the incident ultrasonic wave 42. The reflected ultrasonic wave may be received by the transducer 40, which may produce a wave display as shown in FIG. 5. Here, the incident ultrasonic wave 42 may penetrate the workpiece 60 at the post 64, and may be reflected after the incident ultrasonic wave encounters the acoustic interface of the front wall surface 66 and the termination wall surface 69.

In an exemplary embodiment, the transducer 40 may be positioned at three (3) or more different locations.

Figure 6:
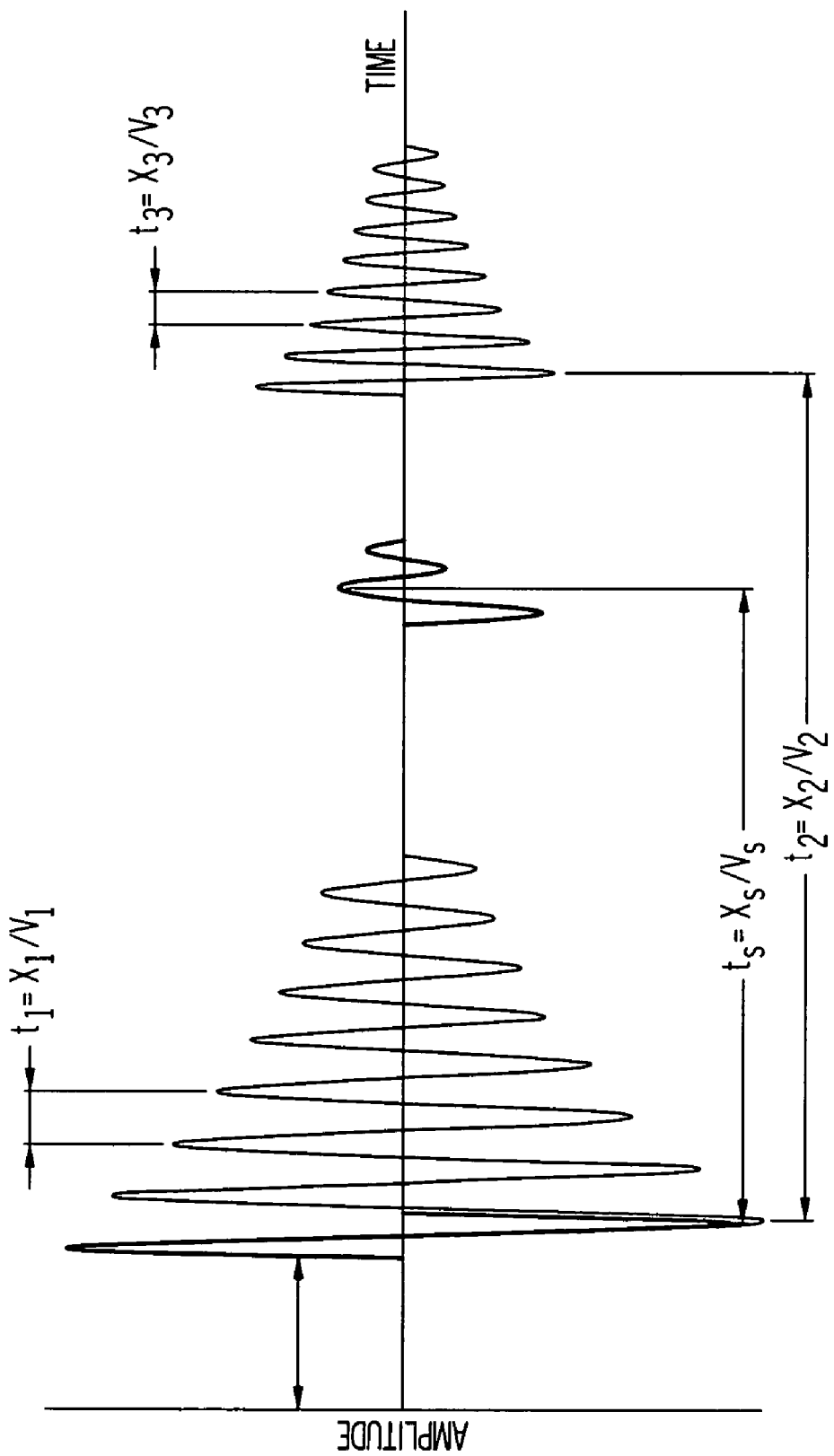
FIG. 6 is an schematic for A scan that is obtained from an ultrasonic scan through both the inner hollow core and the post, according to the present invention.

FIG. 6 illustrates the wave display if one of either the incident wave 42 or the reflected wave 44 traverses the post 64, and the other traverses the hollow core 62, 72, for example if the transducer 40 is positioned and operating between position A and position B.

Thus, at least two samples can be performed. In the first sample, the incident and reflected ultrasonic waves 42, 44 can both traverse the solid material of the workpiece. In the second sample, the incident and reflected ultrasonic waves 42, 44 can both traverse either or both inner hollow core 62 and minor hollow core 72 and the front and back wall as well. When an incident wave 42 traverses an inner hollow core 62 or minor hollow core 72 and encounters an acoustic interface, such as the hollow core proximal surface 67, a first reflected ultrasonic wave can be created, which can be received by the transducer 40.

Wall thickness is dependent on the workpiece thickness ($X_s$) and the size of the hollow core, and/or shape of the hollow core. For example, if the workpiece thickness ($X_s$) is 10 arbitrary units, and the hollow core has a thickness of 6 arbitrary units, this leaves 4 arbitrary units for the thickness of two separate walls that define the hollow core. In this example, one wall may have a thickness of 1 unit, the other 3 units. In an alternative example, both walls may have a thickness of 2 arbitrary units. To determine wall thickness or a shift of the hollow core 62, 72, without knowing the material sound velocity of the workpiece, the following equations can be used to determine wall thickness, core shift, or hollow core dimensions according to the present invention:

$$X_s = V_{m,hkl} t_s = X_1 + X_2 + X_3 \quad \text{Equation 1:}$$

$$X_S = V_{m,hkl} t_1 + V_2 t_2 + V_{m,hkl} t_3 \quad \text{Equation 2:}$$

$$V_{m,hkl} = X_s / t_s \quad \text{Equation 3:}$$

From Equation 3 and Equation 2, another equation can be derived:

$$X_s = (X_s/t_s) t_1 + V_2 t_2 + (X_s/t_s) t_3, \text{ therefore:} \quad \text{Equation 3.5:}$$

$$X_s = (V_2 t_2 t_s)/(t_s - t_1 - t_3), \text{ therefore:} \quad \text{Equation 4:}$$

$$X_2 = V_2 t_2 \quad \text{Equation 5a}$$

$$X_1 = V_{m,hkl} t_1 \quad \text{Equation 5b:}$$

$$X_3 = V_{m,hkl} t_3 \quad \text{Equation 5c:}$$

In an exemplary embodiment, the incident ultrasonic wave 42 may be a pulsed longitudinal wave propagated from a fixed position sufficient time to collect data at position A toward 65 on an initial surface 66 (illustrated in FIGS. 1 and 3) of the workpiece 60, before the transducer 40 is repositioned for further wave propagation toward position B and analysis. One example of this repositioning is illustrated in FIG. 3. Further, in the exemplary embodiment, the transducer 40 may be a flat immersion transducer. In an exemplary embodiment of the present invention, the reflected sound from acoustic interfaces, such as the initial surface 66, core void proximal surface 67, core void distal surface 68, and the termination surface 69, can be measured in a single pass comprising different positions when analyzing a dual wall turbine blade. The number of positions can vary, depending on variables such as desired accuracy, inconclusive wave readings, or size of the workpiece.

Figure 7:
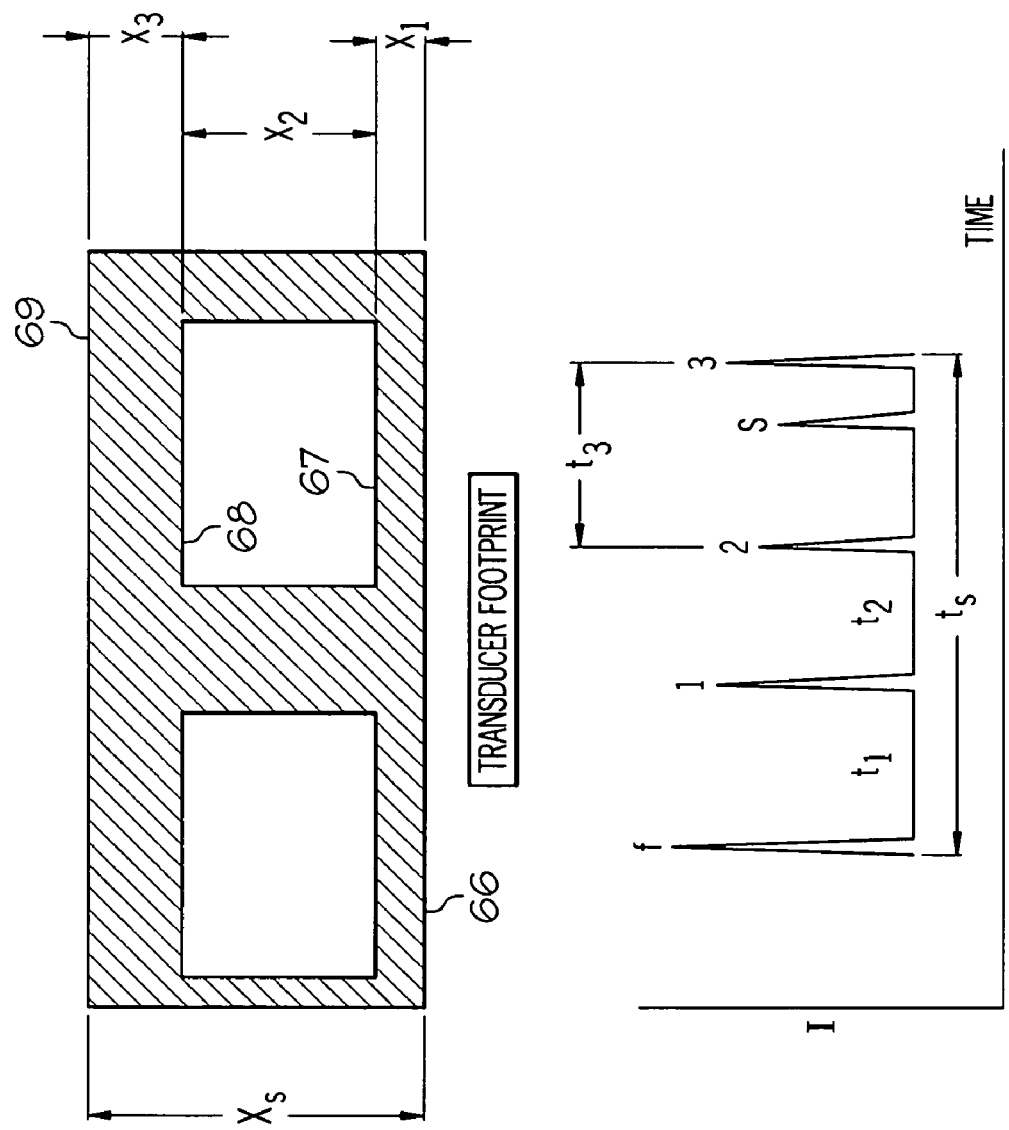
FIG. 7 is a sectional schematic of a dual wall structure and a schematic of an ultrasonic A scan of the dual wall structure, according to the present invention.

FIG. 7 illustrates a schematic of a dual wall structure or workpiece 60 and a corresponding ultrasonic A scan obtained from the transducer 40 output. "t0" defines the time of duration for the reflected wave to travel between the entry surface 66 and the hollow core proximal surface 67. "$t_2$" represents the time of duration for the reflected wave 44 from the hollow core proximal surface 67 to hollow core distal surface 68. "$t_3$" represents the time of duration for the reflected wave 44 from the hollow core distal surface 68 to the termination surface 69. FIG. 7 illustrates the ultrasonic A scan as a graph having a baseline, the x-axis, and echo amplitudes along y-axis at f, 1, 2, S, and 3, as a result of acoustic interfaces. FIG. 7 shows an example of how the time of flight measurements can be represented in a visual means other than the graphs as illustrated in FIGS. 4, 5, and 6. The baseline is for illustration purpose only and does not represent real data.

FIG. 8 illustrates the association of the inner hollow core 62 and minor hollow core 72 with the variables $X_1$, $X_2$, $X_3$, and $X_s$. FIG. 8 depicts that several different hollow cores 62, 72 can exist within one single workpiece, and how the present invention can be used for any of such hollow cores 62, 72. If a shift of minor hollow 72 occurs, $X_1$ and $X_3$ will change in dimension from their respective known values of the mold. When an inner hollow core 62 or minor hollow core 72 shifts from the core mold positions, the variables $X_s$ and either $X_1$ or $X_3$ will change with respect to their respective mold values. Any change of any X value, will change the respective time of flight value of waves 42, 44 per the above-referenced formulas.

Figure 9:
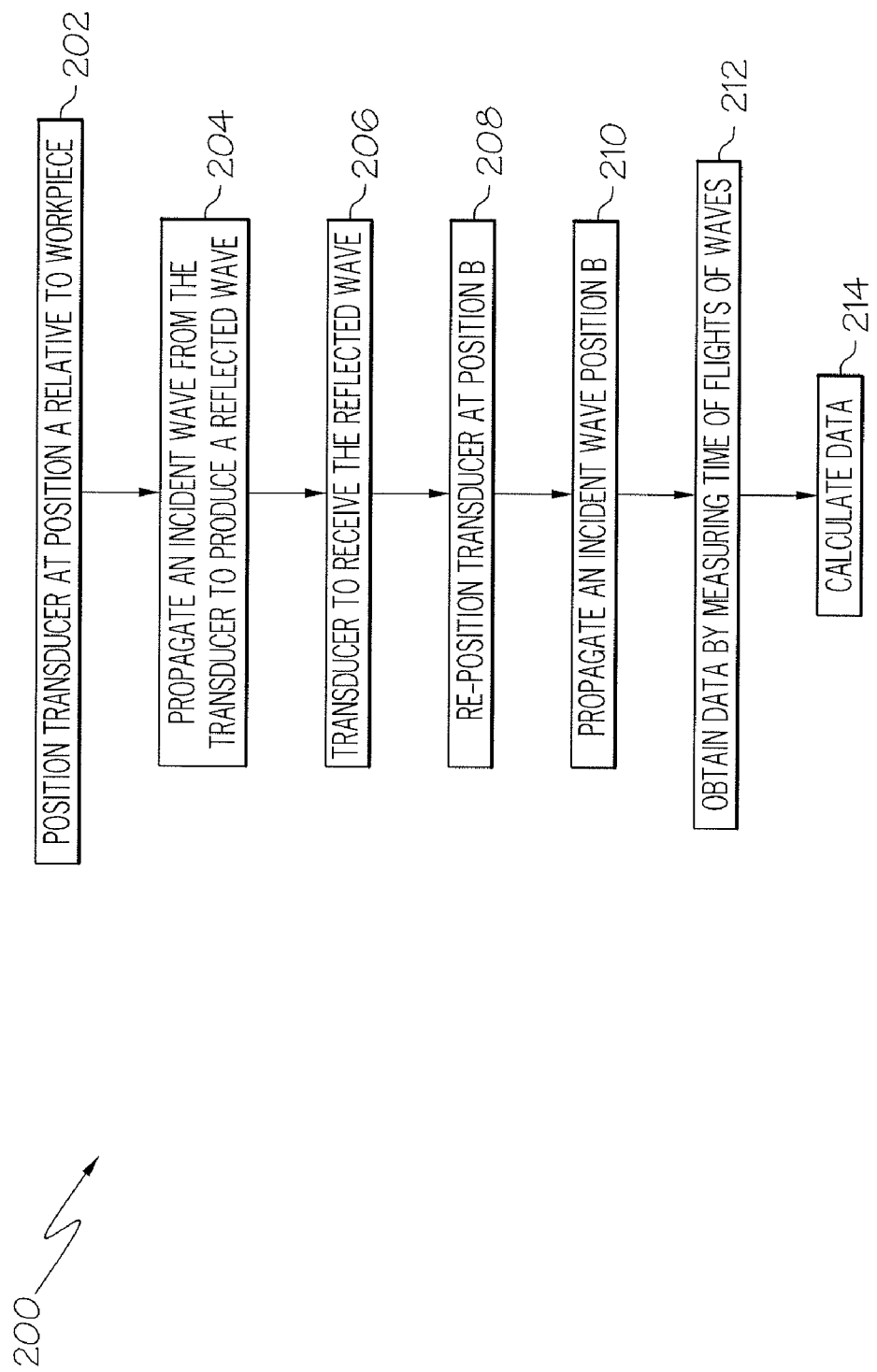
FIG. 9 is a flow chart showing steps of a method of the present invention.

FIG. 9 illustrates one exemplary method 200 for practicing the invention. Specifically, step 202 provides that a transducer 40 should be positioned at a position A relative to a workpiece. Step 204 comprises propagating an incident wave 42, from the transducer 40 that is positioned at the position A toward the workpiece 60, which produces a reflected wave 44. Step 206 comprises the transducer 40 receiving the reflected wave 44. Step 208 includes repositioning the transducer 40 at a position B. Step 210 comprises propagating an incident wave 42 from the position B. In step 212, the time of flights of the waves 42, 44 are measured. Step 214 comprises calculating data, including data gathered from the measuring step 212.

One of the locations in which the transducer 40 is positioned may enable the incident and reflected ultrasonic waves 42, 44 to traverse the material of the workpiece 60, having an unknown material sound velocity. The position A may enable the incident and reflected ultrasonic waves 42, 44 to traverse the inner hollow core 62 and minor hollow core 72, which have a known material sound velocity and walls with unknown material sound velocity as well. In step 212, the time measurements may be obtained by the instrumentation. In step 214 the calculations may be made using equations 1, 2, 3, 4, 5a, 5b and 5c, above to determine the thickness of the dual walls or core shift. Further, the present invention can employ the use of one or more transducers 40. For example, referring to FIG. 3, rather than positioning a transducer 40 at position "A," and then repositioning the same transducer 40 at position "B," the present invention can use two separate transducers 40. For example, a first transducer 40 at position "A" and a second transducer 40 at position "B" for simultaneous propagation, and an even greater time savings.

A computer program can be implemented to control any of the steps of the methods described herein. Further, computer readable media may be operable with the method and apparatus of the present invention for uses such as memory, control of transducer movement and location, reading the time of flight for waves 42, 44, writing results of the calculations, or backup.

A controlling program can be implemented to control the position of a transducer, and initiate ultrasonic wave propagation through a material having a known material sound velocity, and to reposition the transducer and initiate ultrasonic wave propagation through a material having an unknown material sound velocity. Further, an interpretation program can be used to read and interpret time of flight data from the transducer. Also a calculating program can be implemented to calculate a wall thickness or core shift.

It should be understood, of course, that the foregoing relates to exemplary embodiments of the invention and that modifications may be made without departing from the spirit and scope of the invention as set forth in the following claims.

We claim:

1. A method to determine a dual wall thickness and to detect core dimensions of a workpiece, comprising the steps of:

(a) propagating at least one incident ultrasonic wave from a transducer toward the workpiece either in pulse echo or pitch-catch mode;

(b) receiving a first reflected ultrasonic wave by said transducer, said first reflected ultrasonic wave resulting from said incident ultrasonic wave encountering at least one acoustic interface of the workpiece, said incident ultrasonic wave and said first reflected ultrasonic wave both traversing material having an unknown material sound velocity;

(c) receiving a second reflected ultrasonic wave by said transducer, said second reflected ultrasonic wave resulting from incident ultrasonic wave encountering said at least one acoustic interface of the workpiece, said incident ultrasonic wave and said first reflected ultrasonic wave both traversing material having a known and unknown material sound velocity in core and walls respectively;

(d) determining at least one duration of time from each of said propagating steps to each of said respective receiving steps from said first position and said second position; and (e) calculating the dual wall thickness and core dimensions of the workpiece, based on the determined durations of time.

2. The method of claim 1, wherein:
said incident ultrasonic waves are propagated at a frequency between about 1 megahertz and about 100 megahertz.

3. The method of claim 1, wherein:
said material having a known material sound velocity fills at least one hollow core or void within the workpiece.

4. The method of claim 1 wherein:
the workpiece is immersed in a liquid or otherwise coupled with a liquid during said steps (a), (b) and (c).

5. The method of claim 1, further comprising:
computer readable media operably connected to at least one of said determining step, or said calculating step.

6. The method of claim 1, wherein:
said calculating step uses the equation $V_{m,hkl}=(X_S/t_S)$, where $V_{m,hkl}$ is the velocity of said incident ultrasonic wave in a post, and a thickness of a front wall of the workpiece is determined by $X_1=V_{m,hkl} \cdot t_1$, where $X_1$ is the thickness of the front wall;

a thickness of a back wall of the workpiece is determined by $X_3=V_{m,hkl} \cdot t_3$, where $X_3$ is the thickness of the back wall; and a computer-readable media is operable with said calculating step.

7. The method of claim 1, wherein:
said calculating step uses at least one of the equations;

$X_s = V_{m,hkl} t_s = X_1 + X_2 + X_3$     Equation 1:

$X_S = V_{m,hkl} t_1 = V_2 t_2 + V_{m,hkl} t_3$     Equation 2:

$V_{m,hkl} = X_s/t_s$     Equation 3:

$X_s = (X_s/t_s) t_1 + V_2 t_2 + (X_s/t_s) t_3$     Equation 3.5

$X_s = (V_2 t_2 t_s)/(t_s - t_1 - t_3)$     Equation 4:

$X_2 = V_2 t_2$     Equation 5a:

$X_1 = V_{m,hkl} t_1$     Equation 5b:

$X_3 = V_{m,hkl} t_3$     Equation 5c:

to determine wall thickness or core shift.

8. The method of claim 1, wherein:
said propagating step (a) occurs in at least two different locations in one single pass of the workpiece.

9. The method of claim 1, wherein:
said material having a known material sound velocity fills at least one hollow core or void within the workpiece.

10. The method of claim 1, wherein:
said transducer is a contact transducer that propagates waves in either single delay line pulse echo mode or dual element in pitch-catch.

11. The method of claim 10, wherein:
said transducer is a focused or non-focused transducer.

12. An ultrasonic inspection method for a dual wall structure having solid material and a hollow core, comprising the steps of:

(a) positioning an immersion transducer for wave propagation toward a surface of the dual wall structure, said immersion transducer capable of propagating a pulsed incident longitudinal ultrasonic wave at position A and capable of being repositioned at a position B relative to the workpiece for propagating a pulsed incident longitudinal ultrasonic wave at position B;

(b) propagating said pulsed incident longitudinal ultrasonic wave at position A of said surface, said pulsed incident longitudinal ultrasonic wave at position A directed substantially perpendicular to said surface;

(c) receiving a first reflected ultrasonic wave resulting from said pulsed incident longitudinal ultrasonic wave at position A encountering at least one acoustic interface;

(d) propagating said pulsed incident longitudinal ultrasonic wave at position B toward a second area of said surface, said pulsed incident longitudinal ultrasonic wave at position B directed substantially perpendicular to said area;

(e) receiving a reflected ultrasonic wave resulting from said pulsed incident longitudinal ultrasonic wave at position B encountering said at least one acoustic interface, whereby the position of said transducer at one of said locations enables either of said incident and resulting reflected wave, or said incident at another position and resulting reflected wave to traverse through the solid material of the workpiece, and the position of the transducer at the other said location enables the other of said incident and resulting reflected wave, or said incident and reflected wave to traverse through the hollow core of the workpiece, respectively; and (f) measuring the time of flight from said propagating step to said receiving step.

13. The method of claim 12, wherein said wave propagation occurring at a frequency between about 10 megahertz to about 100 megahertz.

14. The method of claim 12, further comprising a step of calculating the dual wall thickness or detecting core shift by the equation $V_{m,hkl}=(Xs/t_s)$, where $V_{m,hkl}$ is the velocity of said pulsed incident longitudinal ultrasonic wave at position B in a turbine blade post, and a thickness of a front wall of the workpiece is determined by $X_1=V_{m,hkl} \cdot t_1$, where $X_1$ is the thickness of the front wall and a thickness of a back wall of the workpiece is determined by $X_3=V_{m,hkl} \cdot t_3$, where $X_3$ is the thickness of the back wall.

15. An ultrasonic testing method to determine characteristics of a dual wall turbine blade having a hollow core and post therein, comprising the steps of:

(a) positioning an immersion transducer at a position A for wave propagation toward an area on a surface of the turbine blade, said immersion transducer capable of propagating an incident pulsed ultrasonic wave and receiving a reflected ultrasonic wave, said immersion transducer capable of being repositioned at a position B for wave propagation and reception;

(b) propagating said incident pulsed ultrasonic wave and receiving said reflected ultrasonic wave while said transducer is at said position A, and while said transducer is at said position B, said position A directs said incident pulsed ultrasonic wave to traverse the hollow core of the dual wall turbine blade, and said position B directs said incident pulsed and reflected ultrasonic waves to traverse the post of the dual wall turbine blade;

(c) measuring a time of flight of said incident pulsed ultrasonic wave and said reflected wave while said immersion transducer is at said position A and said position B, respectively; and (d) determining the characteristics of the turbine blade from information obtained from said measuring step.

16. The method of claim 15, wherein said determining step includes calculating the dual wall thickness or detecting core shift by the equation $V_{m,hkl}=(X_s/t_s)$, where $V_{m,hkl}$ is the velocity of said incident pulsed ultrasonic wave in a turbine blade post, and a thickness of a front wall of the workpiece is determined by $X_1=V_{m,hkl} \cdot t_1$, where $X_1$ is the thickness of the front wall and a thickness of a back wall of the workpiece is determined by $X_3=V_{m,hkl} \cdot t_3$, where $X_3$ is the thickness of the back wall; and presenting the results of said determining step.

17. The method of claim 15, wherein:
said incident pulsed ultrasonic wave is propagated at a frequency between about 1 megahertz and about 100 megahertz.

18. The method of claim 15, wherein:
said incident pulsed ultrasonic wave is propagated at a frequency between about 10 megahertz and about 100 megahertz.

19. The method of claim 15, wherein:
said propagating step lasts for a time needed for data acquisition.

20. The method of claim 15, wherein:
said propagating step takes place at least 2 different locations relative to the turbine blade and in a single path.

21. The method of claim 15 wherein said determining step includes using equations;

$$X_s = V_{m,hkl} t_s = X_1 + X_2 + X_3$$

$$X_S = V_{m,hkl} t_1 + V_2 t_2 + V_{m,hkl} t_3$$

$$V_{m,hkl} = X_s/t_s$$

$$X_s = (X_s/t_s) t_1 + V_2 t_2 + (X_s/t_s) t_3$$

$$X_s = (V_2 t_2 t_s)/(t_s - t_1 - t_3)$$

$$X_2 = V_2 t_2$$

$$X_1 = V_{m,hkl} t_1$$

$$X_3 = V_{m,hkl} t_3$$

to calculate wall thickness or core shift.

22. The method of claim 15, wherein said determining step includes the use of computer-readable media for determining, storage, writing, reading, or memory.

23. The method of claim 15, wherein said transducer is either a flat transducer, a parallel transducer, an immersion transducer, a cylindrical transducer, a spherical transducer, a focused (Spherical or Cylindrical) and non-focused (Collimated or Parallel), or a contact transducer.

* * * * *

UNITED STATES PATENT AND TRADEMARK OFFICE
CERTIFICATE OF CORRECTION

PATENT NO. : 7,272,529 B2  Page 1 of 1
APPLICATION NO. : 11/178020
DATED : September 18, 2007
INVENTOR(S) : Robert J. Hogan et al.

It is certified that error appears in the above-identified patent and that said Letters Patent is hereby corrected as shown below:

Column 9, line 54, the Formula should read --$V_{m, hkl} = X_s/t$--.

Signed and Sealed this

Twenty-seventh Day of November, 2007

JON W. DUDAS
*Director of the United States Patent and Trademark Office*